(12) United States Patent
Marason (10) Patent No.: US 10,178,318 B1
(45) Date of Patent: Jan. 8, 2019

(54) SELF-IMAGING ALIGNMENT INDICATOR

(71) Applicant: Amazon Technologies, Inc., Seattle, WA (US)

(72) Inventor: Eric Gifford Marason, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 496 days.

(21) Appl. No.: 15/053,704

(22) Filed: Feb. 25, 2016

(51) Int. Cl.
| | | |
|---|---|---|
| *H04N 5/232* | (2006.01) |
| *G02B 13/00* | (2006.01) |
| *G06T 7/00* | (2017.01) |
| *G06K 9/52* | (2006.01) |
| *G06T 7/60* | (2017.01) |
| *G06K 9/46* | (2006.01) |
| *G06T 7/40* | (2017.01) |
| *G06T 11/60* | (2006.01) |
| *G02B 27/10* | (2006.01) |
| *G02B 27/12* | (2006.01) |

(52) U.S. Cl.
CPC ..... *H04N 5/23293* (2013.01); *G02B 27/1006* (2013.01); *G02B 27/123* (2013.01); *G06K 9/4652* (2013.01); *G06K 9/52* (2013.01); *G06T 7/0042* (2013.01); *G06T 7/408* (2013.01); *G06T 7/60* (2013.01); *G06T 11/60* (2013.01); *G06T 2207/30196* (2013.01); *G06T 2207/30244* (2013.01)

(58) Field of Classification Search
None
See application file for complete search history.

(56) References Cited

U.S. PATENT DOCUMENTS

2016/0134803 A1* 5/2016 Deng ................. H04N 5/23222
348/222.1

* cited by examiner

*Primary Examiner* — Anand S Rao
*Assistant Examiner* — Tyler B Edwards
(74) *Attorney, Agent, or Firm* — Lee & Hayes, PLLC (57) ABSTRACT

A self-imaging device, which may lack an active visual display, has an alignment indicator that a person can view to determine when he or she is positioned properly in front of the self-imaging device. The indicator comprises a lenticular lens panel having lenses that are positioned over respectively corresponding graphical patterns. Depending on the configuration of the graphical patterns, the lens panel projects different composite images in different directions. When the person is properly aligned, the person will observe a composite image that indicates alignment. When the person is not properly aligned, the person will observe a composite image that indicates non-alignment. The graphical patterns are illuminated by a light guide, which is a panel that distributes light across the graphical patterns.

20 Claims, 7 Drawing Sheets

SELF-IMAGING ALIGNMENT INDICATOR

BACKGROUND

The use of cameras for self-imaging has become very popular, and cameras are being incorporated in many different types of devices. Most popularly, mobile telephones and other portable electronic devices commonly contain cameras that are capable of capturing high quality images both of a user and of the user's surroundings.

Photographs of users captured with smartphones and other mobile devices are commonly shared with friends and others using various social networking services and websites. A user may capture an image of himself or herself for general sharing, for representing the user in conjunction with social services, for use as an online avatar, for use as identification, etc. In addition, cameras are used ubiquitously for things such as security, surveillance, identification, authentication.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are automated devices for capturing photographs of people. In certain embodiments, a stationary device has a camera that captures a photographic image of a person when the person stands in front of the device. The device may lack a graphical display for previewing the image, which may in certain situations make it difficult for the person to know when he or she is positioned properly in front of the device. However, the device may have a passive position indicator that the person looks at to determine when he or she is centered or otherwise properly aligned within the field-of-view of the device camera. The person may move about until the position indicator shows a visible indication that the person is in a centered or aligned position.

The position indicator may comprise a lenticular lens panel that is positioned over a substrate upon which has been applied a permanent, visual pattern. In particular, the lens panel may comprise an array of small lenses that are positioned over respective visual components of the printed substrate. Each lens projects different parts of the corresponding visual component to different viewpoints. When a person views the position indicator from a centered viewpoint, for example, the lens projects a first portion of the corresponding visual component to the viewpoint of the person. When the person views the position indicator from an off-centered viewpoint, the lens projects a second portion of the corresponding visual component to the viewpoint of the person. By making the first and second portions different colors, the collective lenses of the lens panel project a first color to the person when the person is in an aligned position and a different color when the person is not in an aligned position. Thus, the person can move around while viewing the position indicator until seeing the first color to ensure alignment within the field of view of the device camera.

The position indicator may be illuminated in order to enhance its visibility. Specifically, a light guide may be used to illuminate the visual components of the substrate. A light guide may comprise a transparent panel overlying the substrate and one or more light sources that emit light into the transparent panel. The transparent panel has opposing surfaces that cause diffusion and partial internal reflections of the light so that some of the light is emitted from the surfaces of the panel while some of the light also propagates across the panel, thereby providing relatively uniform illumination of the substrate.

In certain embodiments, the printed substrate may comprise an opaque sheet upon which the visual components are indelibly and permanently printed, and the light guide may be positioned between the printed substrate and the lenticular lens panel. In other embodiments, the printed substrate may comprise a transparent substrate, the visual components may be indelibly printed using partially transparent inks, and an illuminator may be positioned behind the printed substrate. The illuminator may comprise a light guide as already discussed or may comprise any other type of light source such as an LED or an array of LEDs positioned behind the transparent substrate. In some embodiments, the visual components may be printed or otherwise indelibly produced on the back of the lens panel or on a surface of a light guide.

The lens panel may comprise a one-dimensional (1D) array of lenses or a two-dimensional (2D) array of lenses. A 1D array comprises an array of cylindrical lenses that provides an indication of alignment in a single direction, such as in a horizontal or vertical direction. A 2D array comprises an array of spherical lenses that provides an indication of alignment in two directions or more, such as in both the vertical and horizontal directions. The visual components may be configured differently depending on whether the lens array is a 1D array or a 2D array.

In some cases, the visual components of the substrate may be configured so that in composite they produce symbols or icons, such as directional arrows, depending on the alignment of a person with the position indicator. For example, the visual components may present an arrow indicating the direction that the person should move in order to achieve alignment with the device. In certain embodiments, more complex images may be displayed depending on the position of the viewing person, including textual messages instructing the person how to move to achieve alignment within the field of view of the camera, and possibly presenting instructions regarding how to proceed once the person has achieved alignment.

A position indicator such as described herein may be used in conjunction with various types of self-service imaging devices. As an example, a camera device may be mounted in a stationary position, such as on a wall within the home of a person. The camera device may be used for taking pictures of the person in various types of clothing, and may be connected to a network service that evaluates the person's clothing and/or provides recommendations regarding accessories, purchases, etc. The device may be small and inconspicuous, and may lack a graphical display. In order to ensure that he or she is properly within the field of view of the camera device prior to capturing an image, the person may move about until seeing an alignment indication in the position indicator. For example, the person may move about until the color projected to and observed by the person changes from red to green.

Similarly, a position indicator may be used in conjunction with a kiosk or other self-service device that takes pictures of people for various purposes, such as for identification cards, membership cards, passports, etc. Further examples may include taking pictures of people for authorization, authentication, identification, etc.

Figure 1:
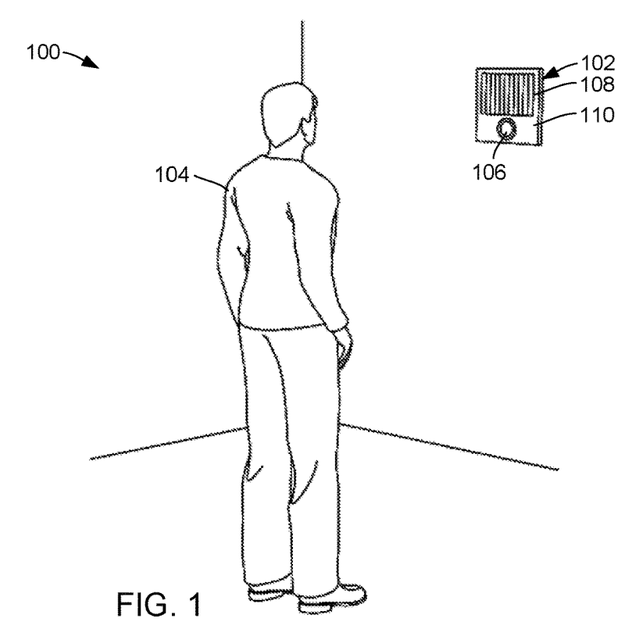
FIG. 1 is a view of an environment in which a person is standing in front of an image capture device having a position indicator.

FIG. 1 illustrates an example environment 100 containing a photographic device 102 that is used for taking pictures of a person 104. The photographic device has a camera 106 (represented by a lens of the camera in FIG. 1) for capturing images of the person 104. The camera may comprise a lens, an optical image sensor, and associated electronics.

In this embodiment, the device 102 and its camera 106 are configured to operate from a stationary position, such as being mounted to a wall or other vertical surface. In other embodiments, the device 102 may be part of a stationary kiosk or other apparatus that is used as a self-service device for taking pictures of persons. In yet other embodiments, the device 102 may be a portable or handheld device.

Figure 2:
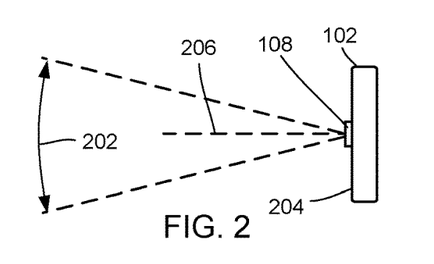
FIG. 2 is a top view of the image capture device, illustrating the field-of-view (FOV) of the image capture device.

FIG. 2 illustrates the field-of-view (FOV) 202 of the camera 106. In this example, the FOV 202 is centered in a direction of 180 degrees from a front surface 204 of the device 102. As an example, the FOV 202 may correspond to an angle of approximately 25-90 degrees. FIG. 2 also shows a reference line 206 that is perpendicular to the front surface 204 of the device 102.

Returning to FIG. 1, the device 102 also has a passive position indicator 108 that the person 104 looks at to determine when he or she is in a proper or desired alignment within the camera FOV 202. In this embodiment, the position indicator 108 provides a visual indication that the person is viewing the camera 106 from a central viewing angle relative to the camera FOV 202.

Generally, as will be described in more detail below, the position indicator 108 may comprise a lenticular lens array overlying an illuminated pattern. The lenticular lens array projects a different color or image to the person 104 depending on the angle from which the person is viewing the position indicator 108.

In the illustrated embodiment, the camera 106 and the position indicator 108 are mounted in or on a common housing or chassis 110, with the position indicator 108 having a fixed position relative to the camera 106. In other embodiments, the camera 106 and position indicator 108 may be attached independently to one or more mounting surfaces, such as being mounted in a fixed relative position to each other on a wall or other supporting structure.

Figure 3:
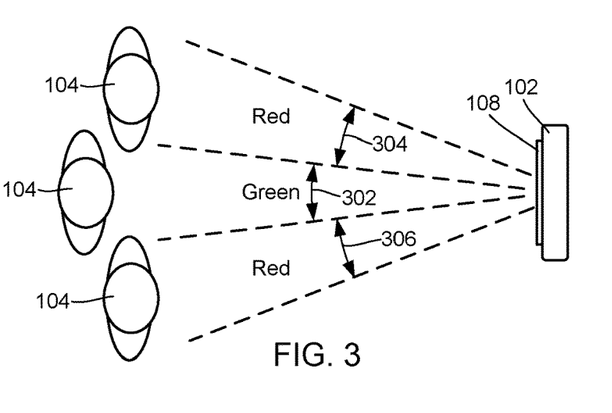
FIG. 3 is a top view of the image capture device and person, illustrating projection angles of the position indicator.

FIG. 3 illustrates an example of how the position indicator 108 may work in one embodiment. In this embodiment, the person 104 is shown at three different viewing angles relative to the position indicator 108 and the device 102, wherein the viewing angle is relative to the reference line 206 (FIG. 2) that is perpendicular to the front surface 204 of the device 102. The central position of the person, centered along the reference line 206, corresponds to a 0 degree viewing angle.

The position indicator 108 projects the color green in a central direction to a person who is in viewing the position indicator 108 from within a range of central viewing angles relative to the FOV 202 of the camera 106. The central direction is within a central projection angle 302 that is aligned and/or concentric with the FOV 202 of the camera 106. In some embodiments, the central projection angle 302 may be smaller than the camera FOV 202 in order to achieve an alignment of the person 104 in which the eyes of the person 104 are centered within the camera FOV 202. The range of central viewing angles may include the central projection angle 302 and may include angles on either side of the central projection angle 302.

The position indicator 108 projects the color red in an off-center direction to a person who is viewing the position indicator 108 from outside the range of central viewing angles. For example, the color red may be projected by the position indicator 108 in a projection angle 304 that is not aligned or concentric with the FOV 202 of the camera 106, and in a projection angle 306 that is not aligned or concentric with the FOV 202 of the camera 106. The outer projection angles 304 and 306 surround the central projection angle 302 in this embodiment.

More generally, the position indicator 108 may project a first color, pattern, or image in a first direction to a person who is viewing the device 102 from a first viewing angle; to project a second color, pattern, or image in a second direction to a person who is viewing the device 102 from a second viewing angle; and to project a third color, pattern, or image in a third direction to a person who is viewing the device 102 from a third viewing angle.

Furthermore, although the illustrated embodiment of the position indicator 108 provides for horizontal alignment of the person 104, other embodiments, described below, may be used to provide both horizontal and vertical alignment of a person within the FOV of a camera or other imaging device.

Figure 4A:
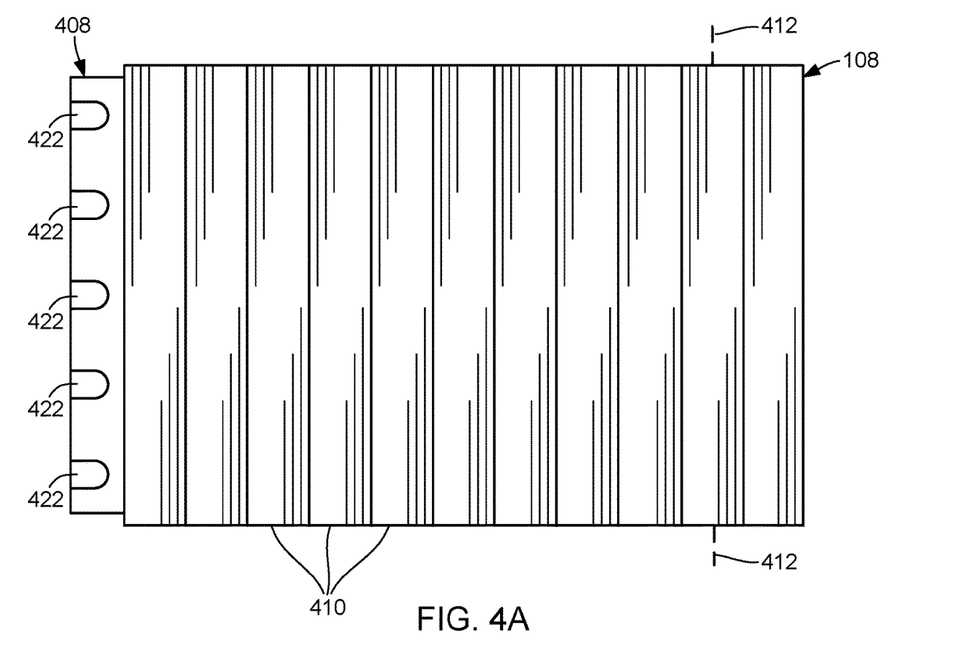
FIG. 4A is a surface view of a position indicator in accordance with an example embodiment.
Figure 4B:
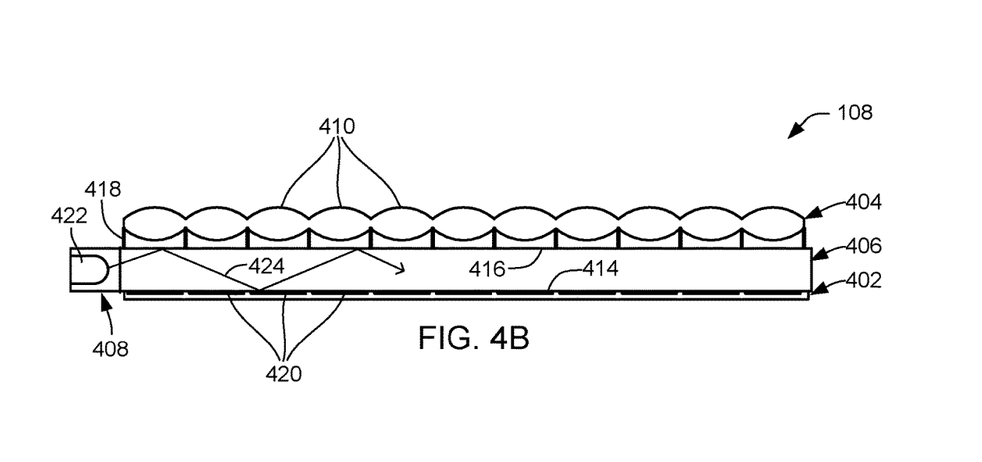
FIG. 4B is a side view of a position indicator in accordance with an example embodiment.

FIGS. 4A and 4B illustrate an example position indicator 108 that may be used in conjunction with various types of photographic imaging devices such as described above. In this example, the position indicator 108 is a one-dimensional (1D) indicator, indicating alignment of a person along a single axis, such as a horizontal or vertical axis.

The position indicator 108 comprises a component stack that comprises a substrate 402, a lens panel 404, a light guide 406, and a light source 408.

The substrate 402 is at the bottom of the stack. The substrate 402 may comprise an opaque sheet such as paper, cardboard, acetate, Mylar, plastic, etc., to which a visual pattern is indelibly and permanently applied.

The lens panel 404 is at the top of the stack. The lens panel 404 comprises an array of individual lenses 410, which in the example of FIGS. 4A and 4B comprise convex lenses. More specifically, the lenses 410 in the depicted example comprise double-convex cylindrical lenses, which are positioned adjacent each other to form a linear, one-dimensional array of lenses. Each lens has a central, longitudinal axis 412. Plano-convex lenses may be used in other embodiments.

The light guide 406, which may also be referred to as an illuminator or illumination panel, is positioned between the lens panel 404 and the substrate 402 to illuminate the substrate 402. The light guide 406 comprises a light-emitting panel having opposite surfaces. The light guide has a bottom surface 414 to which the substrate 402 is adhered. The light guide 108 has a top surface 416 against which the lens panel 404 is positioned. The lens panel 404 may include stand-offs or spacers 418 that space the lenses 410 from the light guide 406 to create an air gap between the lenses 410 and the light panel for optical purposes.

Note that the terms "top" and "bottom," as well as "upper" and lower," are used arbitrarily with respect to the component stack to designate an order or arrangement of the components, and do not necessarily correspond to top and bottom directions of the position indicator 108 when in use.

The substrate 402 has an upper surface upon which is printed a permanent array of indelible visual components 420. The permanent visual components 420 correspond in position, respectively, to the lenses 410 of the lens panel 404. That is, each visual component 420 underlies a corresponding one of the lenses 410, and each of the lenses 410 is aligned with a corresponding visual component 420. The visual components 420 are illuminated by the light guide 406.

Figure 5:
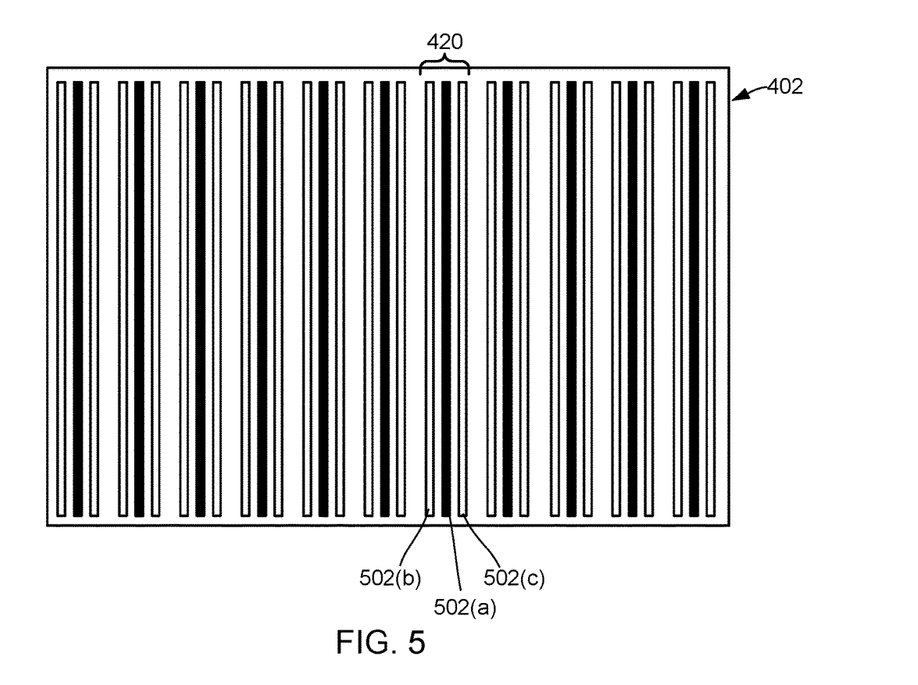
FIG. 5 is a surface view of a substrate that is part of the position indicator.

FIG. 5 shows a top view of the visual components 420 in one example. Each visual component 420 comprises multiple visual elements 502. The visual components 420 are arranged in a lateral array across the top surface of the substrate 402. In this example, each visual component 420 comprises a rectangular pattern comprising stripes that each extend parallel to the longitudinal axis 412 of the corresponding cylindrical lens 410. More specifically, each component 420 comprises three stripe-like elements 502: a central element 502(a) and a pair of surrounding outer elements 502(b) and 502(c). The central element 502(a) is aligned with the central longitudinal axis 412 of the corresponding lens 410, and the outer elements 502(b) and 502(c) are positioned symmetrically on either side of the central element 502(a).

The elements 502 may be of different colors. For example, the central element 502(a) may be a first color such as green and the outer elements 502(b) and 502(c) may be a second color such as red. For purposes of illustration, the central element 502(a) is shown as black in FIG. 2, and the outer elements 502(b) and 502(c) are shown as white.

Returning to FIGS. 4A and 4B, the light guide 406 may comprise a panel or sheet formed by a transparent or semitransparent material such as glass or plastic. For example, the panel may comprise polymethyl methacrylate (PMMA). Other materials, including other transparent thermoplastics in sheet form, may also be used.

The light source 408 may be positioned against a side of the light guide 406 to emit light and/or to project visible light into the light guide 406. The light source 408 may include an array of light-emitting diodes (LEDs) 422 that produce the visible light and that emit the visible light into the light guide 406 through a side surface of the light guide 406.

As the emitted light travels through the light guide 406, it experiences partial or diffused reflection and scattering from the top and bottom surfaces 414 and 416 of the light guide 406 as indicated by the line 424. Accordingly, emitted light propagates across the light guide 406 by reflecting between the opposite surfaces 414 and 416. Diffused reflection such as this can provide uniform distribution of visible light on the underlying substrate 402. Note that the LEDs 422 may be distributed around the entire periphery of the light guide 406 in some embodiments to improve the uniformity of illumination.

The surfaces 414 and 416 of the light guide 406 may be textured, shaped, and/or treated to enhance or tailor internal reflections to achieve desired levels of reflectivity, diffusion, and light emission. For example, one or both of the surfaces may have physical features, which may be referred to as scattering elements, in order to emit visible light from the light guide 406 in a uniform manner scattering elements may include things such as grooves, bumps, gratings, microlenses, etc. Different types of surface coatings may also be used to provide higher or lower levels of reflectivity at the respective surfaces. In some cases, the outer surfaces 414 and 416 may be textured, shaped, configured, and/or coated differently with respect to each other in order to maximize light output in the direction toward the substrate 402. Furthermore, the scattering elements may vary in type or density across each of the surfaces to achieve uniform light output at different portions of the light guide, despite the varying distances from the LEDs 422.

Figure 6A:
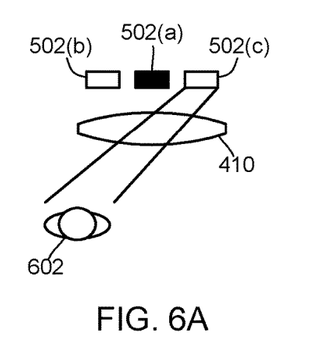
FIGS. 6A, 6B, and 6C are top views illustrating projection of visual elements by the position indicator to a viewing person.
Figure 6B:
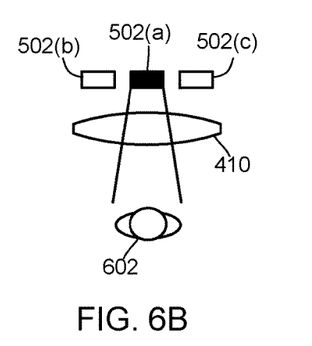
Figure 6C:
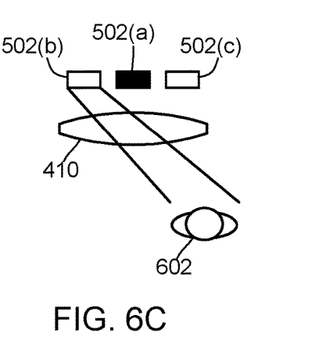

FIGS. 6A, 6B, and 6C illustrate how an individual lens 410 projects information to a person 602, at three different viewing angles of the person relative to the lens 410. In this example it is assumed that the position indicator 108 is mounted so that the longitudinal axes of the cylindrical lenses 410 extend vertically, and that the stripe-like visual elements 502 also extend vertically. FIGS. 6A, 6B, and 6C shown a top view of a scene in which the person 602 is looking at the lens 410.

In FIG. 6A, the person 602 is to the left of center with respect to the lens 410 and underlying visual elements 502. In this example, left and right are used with respect to the direction the person 602 is gazing. In the case of FIG. 6A, the convex lens 410 projects an image of the right-most outer visual element 502(c) in a direction toward to the viewpoint of the person 602. Assuming that the outer visual element 502(c) is colored red, the person 602 will see the color red when looking in the direction of the lens 410.

In FIG. 6B, the person 602 is centered with respect to the lens 410 and underlying visual elements 502. In this case, the convex lens 410 projects an image of the central visual element 502(a) in a direction toward to the viewpoint of the person 602. Assuming that the central visual element 502(a) is colored green, the person 602 will see the color green when looking in the direction of the lens 410.

In FIG. 6C, the person 602 is to the right of center with respect to the lens 410 and underlying visual elements 502. In this case, the convex lens 410 projects an image of the left-most outer visual element 502(b) in a direction toward to the viewpoint of the person 602. Assuming that the outer visual element 502(b) is colored red, the person 602 will see the color red when looking in the direction of the lens 410.

When gazing in the direction of the position indicator 108, the person 602 will see light projected from all of the lenses 410 in combination, creating a composite image comprising all of either the elements 502(a), 502(b), or 502(c). When the person 602 is not centered, all of the lenses 410 will project a corresponding outer visual element 502(b) or 502(c) in a direction toward the viewpoint of the person 602, and the person 602 will therefore see a composite image that is red.

When the person 602 is centered, all of the lenses 410 will project the corresponding central visual element 502(a) in a direction toward the viewpoint of the person 602, and the person 602 will therefore see a composite image that is green.

Figure 7A:
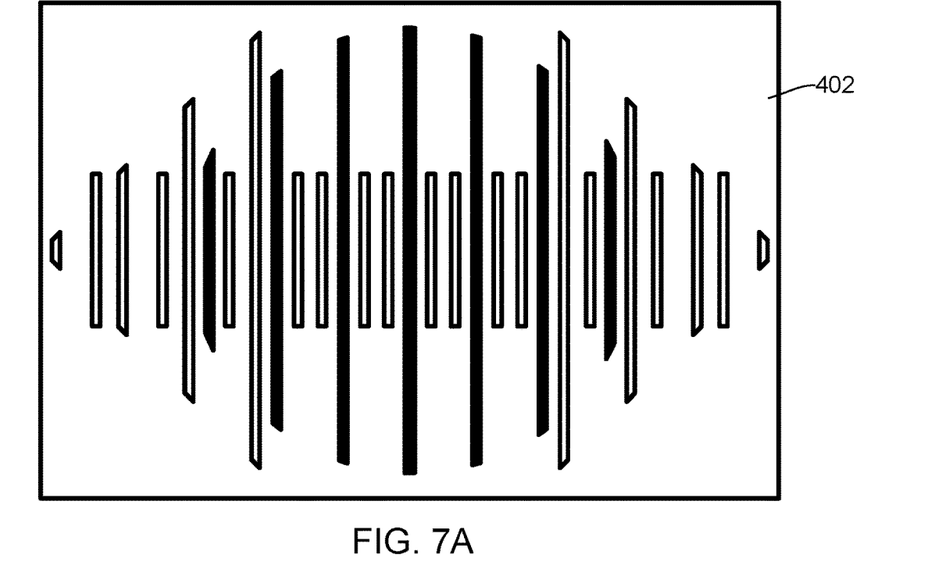
FIGS. 7A, 7B, 7C, and 7D illustrate an example of visual patterns that may be used in conjunction with the position indicator.

FIG. 7A shows a more complex pattern of visual components printed on the substrate 402. In this example, the elements 502(a) create a first composite image, the elements 502(b) create a second composite image, and the elements 502(c) create a third composite image. The composite images may comprise different icons or shapes that are presented to the viewing person depending on the angular alignment of the person with respect to the position indicator 108. In this example, the combined central elements 502(a) are shaped so that in composite they represent a circle, indicating that the person is viewing the position indicator 108 from a first viewing angle relative to the camera FOV 202, and that the person is therefore properly aligned with the position indicator 108. The combined outer elements 502(b) are shaped so that in composite they represent a left-facing arrow, indicating that the person is viewing the position indicator from a second viewing angle relative to the camera FOV 202, and that the person needs to move to the left to achieve alignment. The combined outer elements 502(b) are shaped so that in composite they represent a right-facing arrow, indicating that the person is viewing the position indicator from a third viewing angle relative to the camera FOV 202, and that the person needs to move to the right to achieve alignment.

Figure 7B:
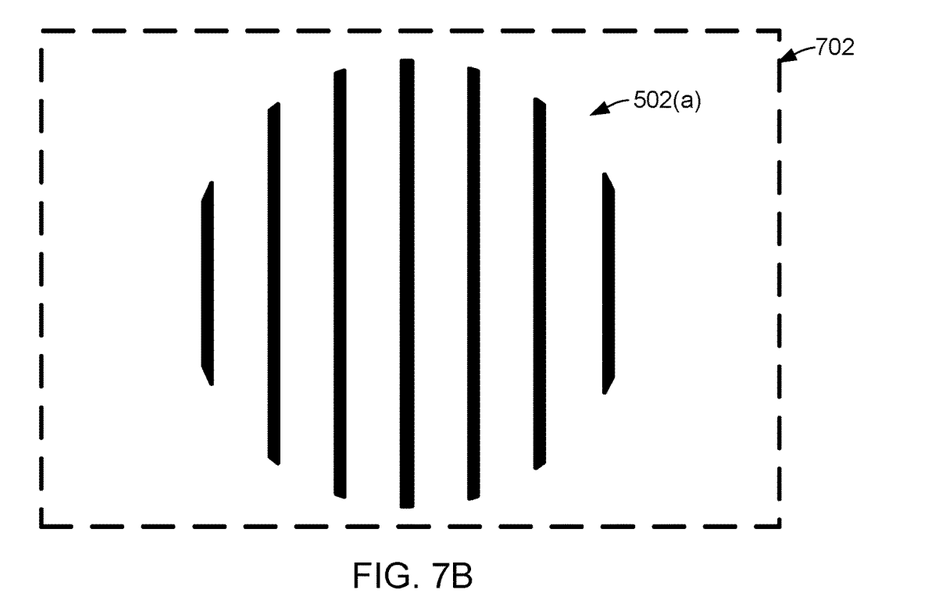
Figure 7C:
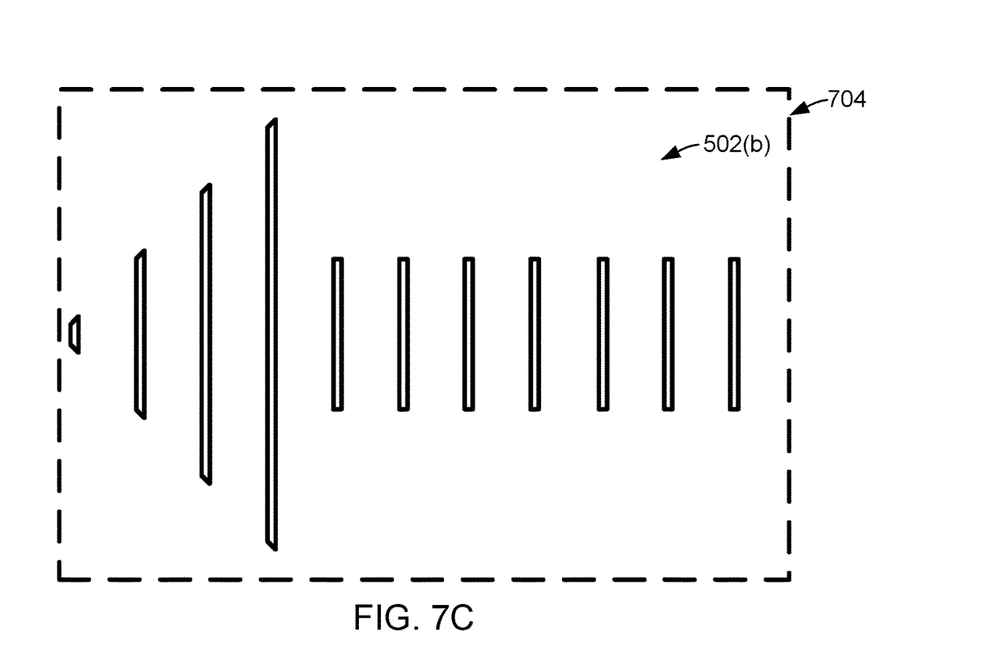
Figure 7D:
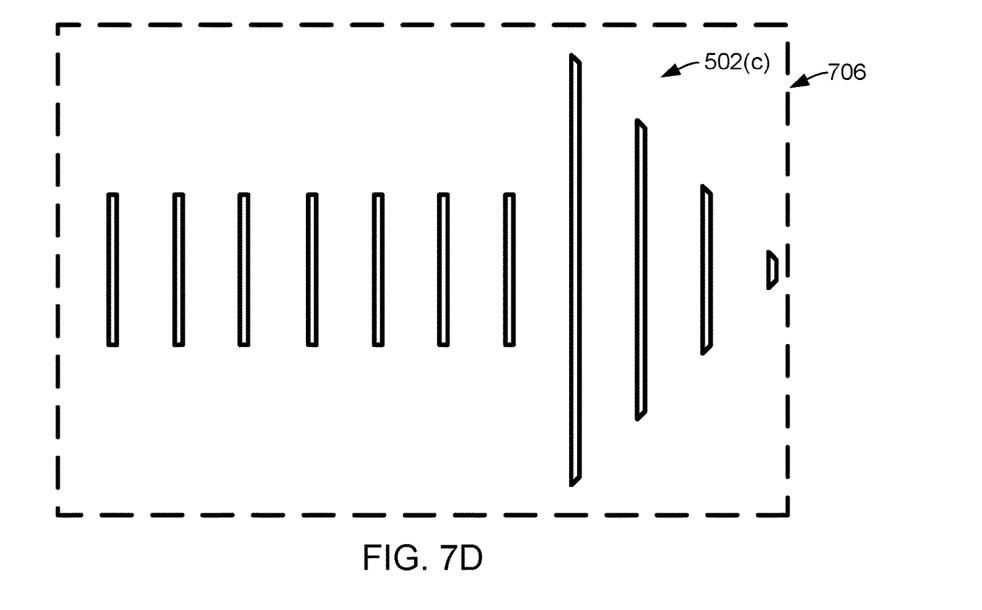

FIG. 7B illustrates a view 702 of the central elements 502(a) that results when the person is centrally aligned as in FIG. 6B. FIG. 7C illustrates a view 704 of the outer elements 502(a) that results when the person is aligned to the right of center as in FIG. 6C. FIG. 7D illustrates a view 706 of the outer elements 502(c) that results when the person is aligned to the left of center as in FIG. 6A.

In actual embodiment, the number and pitch of the lenses 410 and corresponding visual components 420 may be much greater than illustrated, resulting in much higher resolution images being presented to the viewing person. The technique illustrated by FIGS. 7A, 7B, 7C, and 7D may be extended to create more complex shapes and patterns, which may include variable-color images, icons, text, etc. Furthermore, the techniques may be extended to produce more than three different images, corresponding respectively to more than three positions of the viewing person. To achieve this, each of the visual components 420 may comprise more than three distinct visual elements 502. Also note that the visual elements 502 of a single visual component 420 do not need to be spaced from each other as illustrated, and may instead be immediately adjacent each other.

Figure 8:
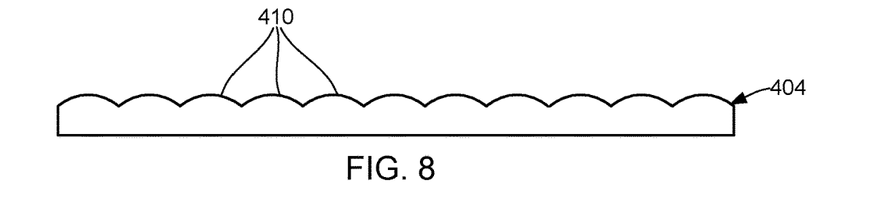
FIG. 8 is a side view of an example embodiment of a lens panel that may be used as part of the position indicator.

FIG. 8 shows an alternative configuration of the lens panel 404, which may be substituted in some embodiments. In this embodiment the lower surface of the lens panel 404 is flat or planar, so that the lens panel forms plano-convex lenses. In FIG. 8, the lens panel 804 is formed, for example, by a molded, machined, or extruded acrylic panel having a ridge-shaped upper surface that forms the upper cylindrical surfaces of the lenses 410. Any of the different lens panel embodiments described herein may be implemented to form plano-convex lenses.

Figure 9:
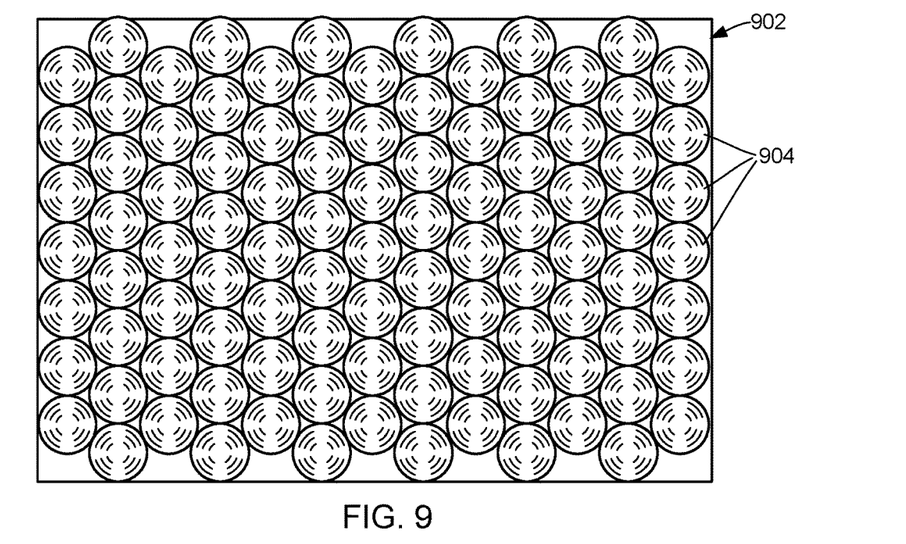
FIG. 9 is a surface view of an example embodiment of a lens panel that may be used as part of the position indicator.

FIG. 9 illustrates another alternative configuration of a lens panel, which is designated in FIG. 9 by the reference numeral 902. In this configuration, the lens panel 902 comprises an array of spherical lenses 904, rather than the cylindrical lenses 410 illustrated in FIGS. 4A and 4B. The lens panel 902 may be molded or machined to form the spherical lenses 904. The spherical lenses 904 may be arranged so that they are adjacent each other in regular rows and columns or interspersed as shown in FIG. 9. The spherical lenses 904 create a 2D lens panel that indicates directional alignments in two or more directions, such as in both the vertical and horizontal directions.

Figure 10:
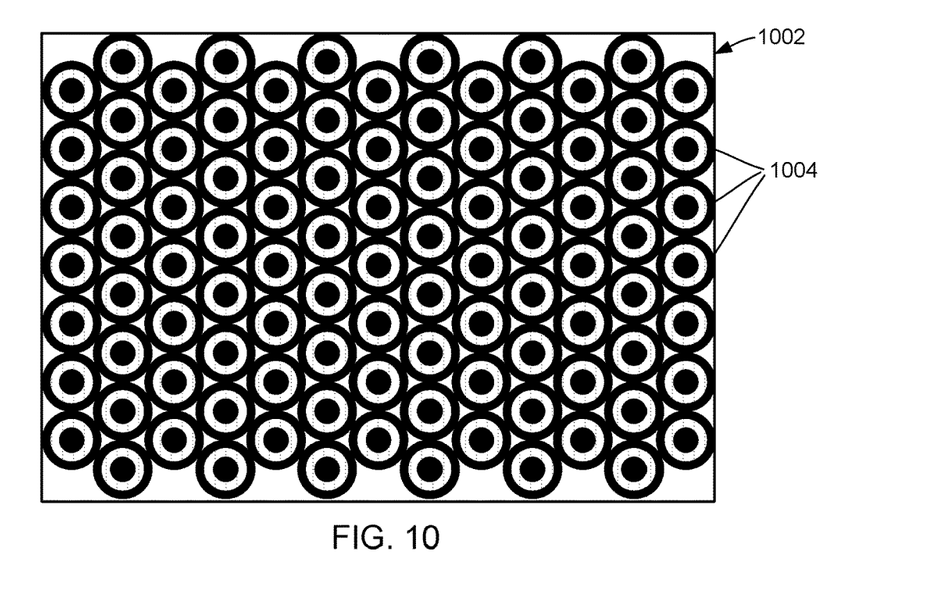
FIG. 10 is a surface view of an example embodiment of visual components that may be used in conjunction with the lens panel of FIG. 9.

FIG. 10 shows an alternative substrate 1002 that may be used in conjunction with the lens panel 902. The substrate 1002 has a two-dimensional array of round or circular visual components 1004, rather than the one-dimensional array of the substrate 402. The visual components 1004 are arranged identically to the spherical lenses of the lens panel 902. Each visual component 1004 comprises a round pattern that corresponds to a respective spherical lens 904 and is positioned beneath the corresponding spherical lens 904.

Figure 11:
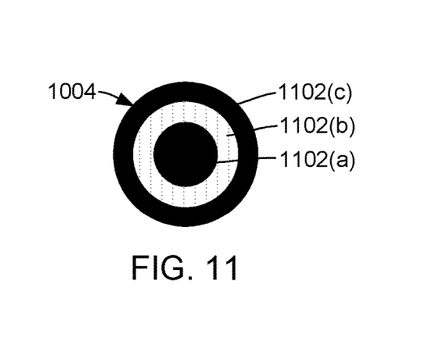
FIGS. 11 and 12 are examples of visual elements that may be used in conjunction with the lens panel of FIG. 9.

FIG. 11 illustrates an example of a single visual component 1004. In this example, the visual component 1004 comprises three visual elements 1102, each of which may be a different color. The visual elements 1102 comprise a central element 1102(a), an intermediate element 1102(b) that is concentric with and at least partially surrounds the central element 1102(a), and an outer element 1102(c) that is concentric with and at least partially surrounds the intermediate element 1102(b).

When viewing the 2D lens panel 902, a person sees the underlying central elements 1102(a) when the person's viewpoint is aligned along the central axes of the lenses 904. When the person's viewpoint is not aligned with the central axes of the lenses, he or she will see either a portion of the intermediate elements 1102(b) or a portion of the outer elements 1102(c), depending on the amount of misalignment. With a low degree of misalignment, the person will see portions of the intermediate elements 1102(b). With a higher degree of misalignment, the person will see portions of the outer elements 1102(c).

Furthermore, a viewing person who is misaligned with the spherical lenses will see a radial portion of the visual elements 1102 that corresponds to the direction of the misalignment. For example, a person who is viewing the lens panel 902 from a relatively low position will see upper portions of the visual elements 1102. A person who is viewing the lens panel 902 from a relatively high position will see lower portions of the visual elements 1102. A person who is to the left of alignment will see right-hand portions of the visual elements 1102. A person who is to the right of alignment will see left-hand portions of the visual elements 1102.

The visual elements 1102 may be configured to have different colors in different regions to indicate misalignment of a person's viewpoint. In some cases, all of the visual elements 1102 may be identical, so that the viewing person is presented with varying colors that depend on the degree of misalignment of the person with the position indicator. For example, the person may see green when aligned with the position indicator and may see red when misaligned. In other cases, the visual elements 1102 may vary so that different patterns, icons, graphics, text, or other indicators are presented to the viewing person, depending on the angle from which the person is viewing the position indicator, similar to the example of FIGS. 7A, 7B, 7C, and 7D.

Note that the position indicators described herein depend on the position or alignment of the viewing person's eyes. In cases where it is desired to align more than a person's face within a camera's field of view, such as both the face and torso of the person, the visual elements 502 or 1102 may be shifted to correspond to the desired alignment of the viewing person's eyes. For example, the central element 1102(a) may be shifted downward so to indicate alignment when the viewing person's eyes are aligned above the central axes of the lenses 904, so that more of the person's body is centrally aligned in with the central axes of the lenses 904.

Figure 12:
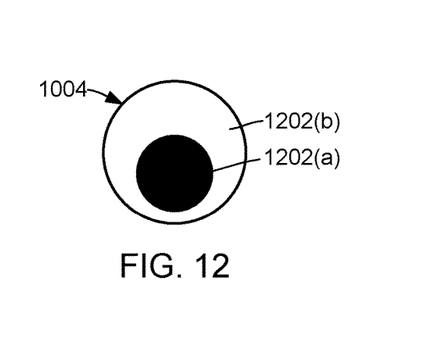

FIG. 12 shows an alternative example of a visual component 1004 for use with the 2D lens panel 902. The visual component 1004 has a first element 1202(*a*) of a first color, such as green, that indicates a desired alignment of a viewing person relative to the central axes of the overlying spherical lens 904. The visual component 1202 has a second element 1202(*b*) of a second color, such as red, that indicates misalignment of the person. The first element 1202(*a*) is positioned lower than center, and the second element 1202 (*b*) surrounds the first element 1202(*a*). The relatively low position of the first element 1202(*a*) makes it so that a person will see the first element 1202(*a*) only when the person's eyes are positioned above the lens panel 902, thereby ensuring that at least a portion of the person's torso or complete body is centered vertically with respect to the position indicator.

Figure 13:
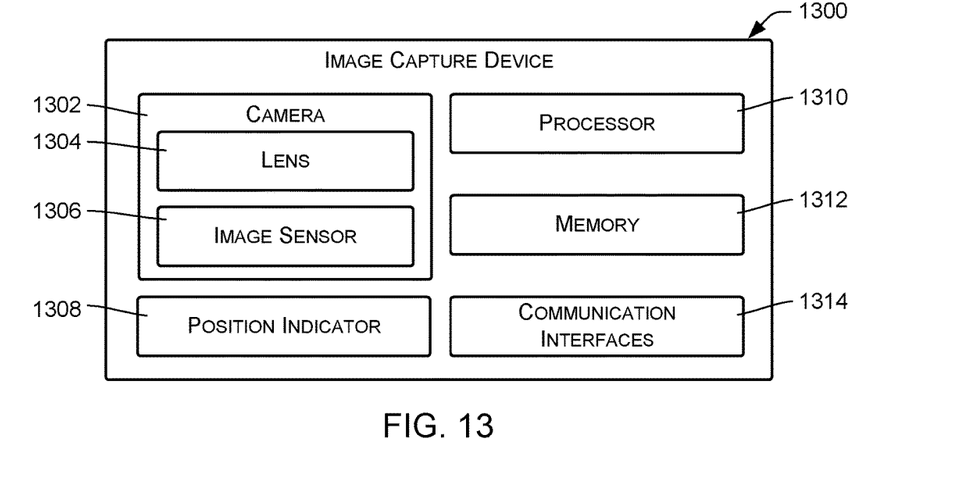
FIG. 13 is a block diagram illustrating high-level components of an image capture device that may incorporate the position indicator.

FIG. 13 shows high-level components of an image capture device 1300 that may be used for capturing self-images in various environments. For example, the image capture device 1300 may comprise an in-home device that is mounted or positioned at a suitable location, and which a person stands in front of to capture a self-image. As another example, the image capture device 1300 may be used in a business environment to capture images of customers or other people for purposes of authentication, identification, etc. Similarly, the image capture device 1300 may be used to generate images for identification cards such as driver's licenses, membership cards, credit cards, etc. The image capture device 1300 is an example embodiment of the photographic device 102 described in the foregoing.

The image capture device 1300 comprises a camera 1302, which comprises a lens 1304 and an associated image sensor 1306. The camera 1302 has a fixed field-of-view (FOV) that is determined by the characteristics of the lens 1304 and image sensor 1306. The image capture device 1300 may in some cases have a processor, memory, and various electronic circuits (not shown) to support the operations of the image sensor 1306.

The image capture device 1300 also comprises a position indicator 1308 as described in detail above. The position indicator 1308 is configured so that when a person is properly aligned within the FOV of the camera 1302, the person will see a visual indication of alignment. When the person is not properly aligned, the person will see an indication that he or she needs to move in order to achieve alignment.

The image capture device 1300 may also comprise a processor 1310 and associated memory 1312. The memory may contain applications, programs, and/or other code for performing specialized functions of the image capture device, such as coordinating image capture, transmitting images to online repositories, printing images, etc. The image capture device 1300 may also have one or more communication interfaces 1314 for communicating with online repositories and services, which may include social networking sites, shopping sites, and sites that provide various other types of services. The communication interfaces may include wired and/or wired interfaces.

Although the subject matter has been described in language specific to structural features, it is to be understood that the subject matter defined in the appended claims is not necessarily limited to the specific features described. Rather, the specific features and acts are disclosed as exemplary forms of implementing the claims.

What is claimed is:

1. A device, comprising:
   a stationary camera configured to capture a photograph of a person, the camera having a field of view;
   a position indicator at a fixed position relative to the camera, the position indicator providing a visual indication to the person that the person is viewing the position indicator from within a range of viewing angles relative to the field of view of the camera, the position indicator comprising:
      a substrate having an array of visual components, a first visual component of the array of visual components having a first visual element of a first color and a second visual element of a second color;
      a lens panel having an array of spherical lenses, a first spherical lens of the array of spherical lenses being aligned with the first visual component to project the first color of the first visual element in a first direction and to project the second color of the second visual element in a second direction;
      an illumination panel between the substrate and the lens panel to illuminate the array of visual components, the illumination panel having thickness; and
      a light-emitting diode that emits light into the illumination panel, wherein the light propagates across the illumination panel by reflecting within the illumination panel;
      and wherein the first spherical lens projects the first color of the first visual element to a first person who is viewing the position indicator from within the range of viewing angles; and
      the first spherical lens projects the second color of the second visual element to a second person who is viewing the position indicator from outside of the range of viewing angles.

2. The device of claim 1, wherein the first visual component comprises a round pattern in which the second visual element surrounds the first visual element.

3. The device of claim 1, wherein the substrate comprises an opaque sheet upon which the visual components are indelibly printed.

4. A device, comprising:
   a camera having a field of view;
   a position indicator comprising:
      an array of visual components, a first visual component of the array of visual components having a first visual element and a second visual element;
      an illuminator that illuminates the array of visual components;
      multiple lenses, a first lens of the multiple lenses being aligned with the first visual component;
      the first lens projecting an image of the first visual element in a first direction from the position indicator;
      the first lens projecting an image of the second visual element in a second direction from the position indicator;
      wherein the first visual element forms a portion of a first composite image that is projected by the multiple lenses in the first direction, the first composite image indicating that the position indicator is being viewed from within a range of viewing angles relative to the field of view of the camera; and
      wherein the second visual element forms a portion of a second composite image that is projected by the multiple lenses in the second direction, the second composite image indicating that the position indicator is being viewed from outside the range of viewing angles.

5. The device of claim 4, wherein:

the first lens comprises a cylindrical lens having a longitudinal axis; and the first visual component comprises a rectangular pattern in which each of the first and second visual elements is a stripe that extends parallel to the longitudinal axis.

6. The device of claim 4, wherein:

the first lens comprises a spherical lens; and the first visual component comprises a round pattern in which the second visual element at least partially surrounds the first visual element.

7. The device of claim 4, wherein the second composite image comprises a directional symbol indicating a direction to move for the first composite image to be viewed.

8. The device of claim 4, wherein:

the first composite image is of a first color; and the second composite image is of a second color.

9. The device of claim 4, the position indicator further comprising a substrate having the visual components, the illuminator being positioned between the lenses and the substrate.

10. The device of claim 4, the position indicator further comprising a substrate having the visual components, the substrate being positioned between the lenses and the illuminator.

11. The device of claim 4, the illuminator comprising:

a panel having opposite surfaces; and a light source that emits light into the panel, wherein the light propagates across the panel by reflecting between the opposite surfaces of the panel.

12. The device of claim 4, wherein:

the position indicator further comprises a transparent substrate upon which the visual components are printed; and the transparent substrate is between the illuminator and the lenses.

13. A device, comprising:

a camera having a field of view;

an array of visual components, a first visual component of the array of visual components having a first visual element and a second visual element;

multiple lenses, a first lens of the multiple lenses being aligned with the first visual component;

the first lens projecting the first visual element in a first direction;

the first lens projecting the second visual element in a second direction;

the first visual element forming a portion of a first composite image, the first composite image indicating that the position indicator is being viewed from within a range of viewing angles relative to the field of view of the camera; and the second visual element forming a portion of a second composite image, the second composite image indicating that the position indicator is being viewed from outside the range of viewing angles.

14. The device of claim 13, further comprising an illuminator positioned to illuminate the array of visual components.

15. The device of claim 13, wherein the second composite image comprises a directional symbol indicating a direction to move for the first composite image to be viewed.

16. The device of claim 13, wherein:

the first composite image is of a first color; and the second composite image is of a second color.

17. The device of claim 13, further comprising an illumination panel between the lenses and the array of visual components, wherein the illumination panel emits light onto the array of visual components.

18. The device of claim 13, further comprising an illuminator positioned to illuminate the array of visual components, the illuminator comprising:

a panel having opposite surfaces; and a light source that emits light into the panel, wherein the light propagates across the panel by reflecting between the opposite surfaces of the panel.

19. The device of claim 13, wherein:

the first lens comprises a cylindrical lens having a longitudinal axis; and the first visual component comprises a rectangular pattern in which each of the first and second visual elements is a stripe that extends parallel to the longitudinal axis.

20. The device of claim 13, wherein:

the first lens comprises a spherical lens; and each visual component comprises a round pattern in which the second element at least partially surrounds the first element.

* * * * *